(12) United States Patent
Koripella et al.

(10) Patent No.: US 6,569,553 B1
(45) Date of Patent: May 27, 2003

(54) FUEL PROCESSOR WITH INTEGRATED FUEL CELL UTILIZING CERAMIC TECHNOLOGY

(75) Inventors: Chowdary Ramesh Koripella, Scottsdale, AZ (US); Christopher K. Dyer, Westfield, NJ (US); Dominic Francis Gervasio, Fountain Hills, AZ (US); Stephen P. Rogers, Phoenix, AZ (US); David Wilcox, Chandler, AZ (US); William Jay Ooms, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 222 days.

(21) Appl. No.: 09/649,553

(22) Filed: Aug. 28, 2000

(51) Int. Cl.[7] .................................................. H01M 8/06

(52) U.S. Cl. ............................. 429/20; 429/19; 429/34

(58) Field of Search ............................... 429/20, 19, 34

(56) References Cited

U.S. PATENT DOCUMENTS 4,816,353 A * 3/1989 Wertheim et al. ............. 429/19
5,858,314 A * 1/1999 Hsu et al.

* cited by examiner

*Primary Examiner*—John S. Maples
(74) *Attorney, Agent, or Firm*—Douglas W. Gilmore; William E. Koch

(57) ABSTRACT

A fuel processor and integrated fuel cell including a monolithic three-dimensional multilayer ceramic carrier structure defining a fuel reformer and including an integrated fuel cell stack. The reformer includes a vaporization zone, a reaction zone including a catalyst, and an integrated heater. The integrated heater is thermally coupled to the reaction zone. The fuel processor further includes an inlet channel for liquid fuel and an outlet channel for hydrogen enriched gas. The fuel processor is formed utilizing multi-layer ceramic technology in which thin ceramic layers are assembled then sintered to provide miniature dimensions in which the encapsulated catalyst converts or reforms inlet fuel into a hydrogen enriched gas.

21 Claims, 4 Drawing Sheets

FUEL PROCESSOR WITH INTEGRATED FUEL CELL UTILIZING CERAMIC TECHNOLOGY

FIELD OF INVENTION

The present invention pertains to fuel cells, and more particularly to a fuel processor and integrated fuel cell fabricated utilizing ceramic technology for improved size and performance benefits.

BACKGROUND OF THE INVENTION

Fuel cells in general, are "battery replacements", and like batteries, produce electricity through an electrochemical process without combustion. The electrochemical process utilized provides for the combining of hydrogen with oxygen from the air. The process is accomplished utilizing a polymer electrolyte membrane (PEM) which conducts protons sandwiched between two electrodes, namely an anode and a cathode. Fuel cells, as known, can provide perpetual electricity as long as fuel and oxygen is supplied. Hydrogen is typically used as the fuel in fuel cells for producing the electricity and it can be processed from methanol, natural gas, petroleum, ammonia, or stored in metal hydrides, carbon nanotubes, or as pure hydrogen. Reformed hydrogen fuel cells (RHFCs) utilize hydrogen fuel processed from liquid or gaseous hydrocarbon fuels, such as methanol, using a fuel reformer.

Reformed hydrogen fuel cells preferably utilize methanol that is reformed into hydrogen as a fuel source. Methanol is the preferred fuel for use in fuel reformers for portable applications because it is easier to reform into hydrogen gas at a relatively low temperature compared to other hydrocarbon fuels such as ethanol, gasoline, or butane. The reforming or converting of methanol into hydrogen usually takes place by one of three different types of reforming. These three types are steam reforming, partial oxidation reforming, and autothermal reforming. of these types, steam reforming is the preferred process for methanol reforming because it is the easiest to control and produces a higher hydrogen output, at a lower temperature, thus lending itself to favored use. During steam reforming, raw methanol is catalytically converted, with the application of heat, to a hydrogen enriched fuel gas for use with fuel cells.

Fuel reformers have been developed for use in conjunction with fuel cell devices, but they are cumbersome and complex devices consisting of several discrete sections connected together with gas plumbing and hardware to produce hydrogen gas, and are thus not suitable for portable power source applications. To date, no fuel reformers have been developed utilizing ceramic monolithic structures in which the miniaturization of the reformer can be achieved. Laminated ceramic components, utilizing ceramic technology, are now commonly being developed for use in microfluidic chemical processing and energy management systems. Monolithic structures formed of these laminated ceramic components provide for components that are inert and stable to chemical reactions and capable of tolerating high temperatures as well as providing for miniaturized components, with a high degree of electronic circuitry or components embedded or integrated into such a ceramic structure for system control and functionality. Additionally, the ceramic materials used to form ceramic devices including microchannels are considered to be excellent candidates for catalyst supports in microreactor devices for generating hydrogen used in conjunction with miniaturized fuel cells.

Accordingly, it is an object of the present invention to provide for a miniaturized fuel processor that provides for the reforming of a fuel to a hydrogen( )enriched fuel gas for use in conjunction with an integrated fuel cell.

It is yet another object of the present invention to provide for a monolithic structure for the reforming of a fuel to a hydrogen enriched gas.

It is still another object of the present invention to provide for a monolithic structure that is formed utilizing ceramic technology, thereby providing for the integration of a plurality of internal plumbing interconnections and electrical circuitry and connections.

It is another object of the present invention to provide for a fuel processor that is miniaturized for use in conjunction with an integrated fuel cell for portable device applications.

SUMMARY OF THE INVENTION

The above problems and others are at least partially solved and the above purposes and others are realized in a fuel processor and integrated fuel cell including a three-dimensional multilayer ceramic carrier structure defining a fuel reformer and including an integrated fuel cell stack. The fuel reformer includes a vaporization zone and a reaction zone including a reforming catalyst. The ceramic carrier further includes an integrated heater thermally coupled to the vaporization and reaction zones, an inlet channel for liquid fuel and an outlet channel for hydrogen enriched gas. The fuel processor is formed utilizing ceramic technology in which thin ceramic layers are assembled then sintered to provide miniature dimensions in which the encapsulated catalyst converts or reforms inlet fuel into a hydrogen enriched gas.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

DESCRIPTION OF THE PREFERRED EMBODIMENTS

Figure 1:
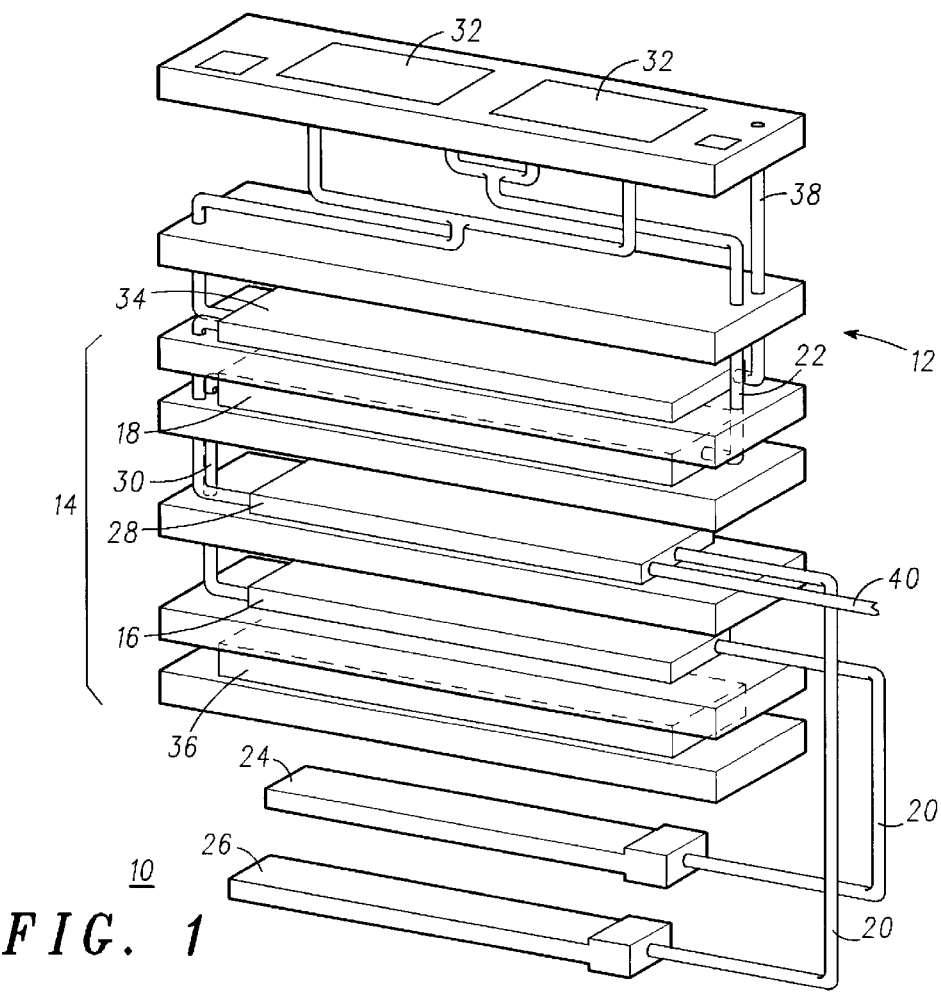
FIG. 1 is a simplified orthogonal view of a fuel processor and integrated fuel cell stack including a plurality of fluidic channels, according to the present invention.
Figure 2:
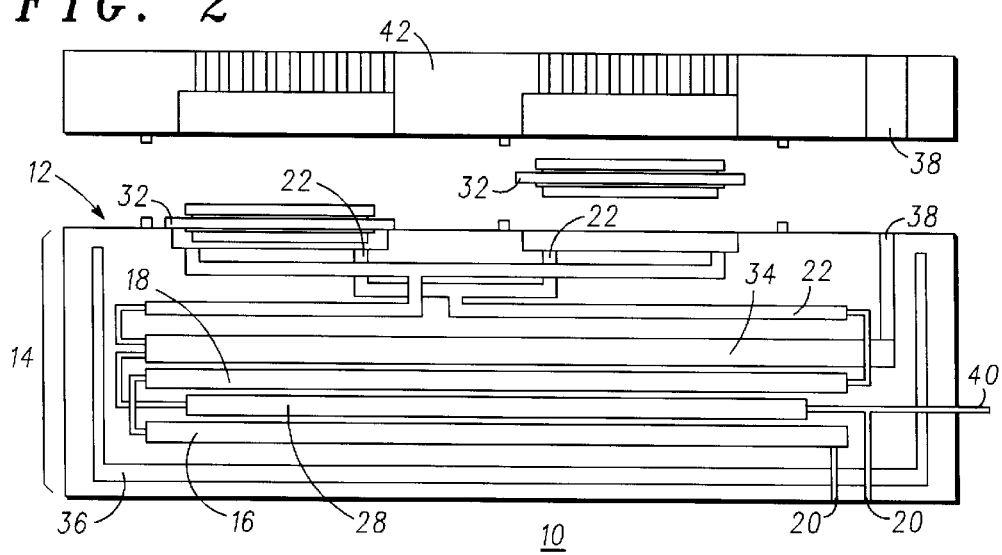
FIG. 2 is a simplified sectional view of a fuel processor and integrated fuel cell stack according to the present invention.

Turning now to the drawings, and particular FIGS. 1 and 2, illustrated in simplified orthogonal view (FIG. 1), and in simplified cross-sectional view (FIG. 2) is a fuel processor 10 including a plurality of microfluidic channels, according to the present invention. Fuel processor 10 is comprised of a three-dimensional multilayer ceramic structure 12. Ceramic structure 12 is formed utilizing multi-layer laminate ceramic technology. Structure 12 is typically formed in component parts which are then sintered in such a way as to provide for a monolithic structure. Ceramic structure 12 has defined therein a fuel reformer, or fuel processor, generally referenced 14. Fuel reformer 14 includes a vaporization chamber, or vaporization zone, 16, a reaction chamber, or reaction zone, 18, and an integrated heat source, 28. Ceramic structure 12 further includes at least one fuel inlet channel 20 in communication with a liquid fuel source of a combination solution methanol/water source 24 and a pure methanol source 26 and a hydrogen enriched gas outlet channel 22.

During operation, heat is efficiently transferred from the central aspect of the device, more particularly an integrated heater 28, to the reaction zone 18 and fuel vaporizer, or vaporization zone 16 using thermal conductive channels, or vias, (discussed presently). In this particular embodiment, integrated heater 28 is described as a chemical heater, including a catalyst and arranged so as to oxidize fuel to produce heat, but it should be understood that the integration of an electrical heater is anticipated by this disclosure. Chemical heater 28 includes an air port 40 for providing oxygen for oxidation of methanol/water 24 and/or pure methanol 26 and an inlet channel 20, for providing methanol/water 24 and/or pure methanol 26 to heater 28.

Output from fuel vaporizer zone 16 travels via channel 30 to reaction zone 18 and then through hydrogen enriched gas outlet channel 22 to a fuel cell stack 32 to supply hydrogen fuel to stack 32. Spent gases from the fuel cell 32 are directed through a waste heat recovery zone 34 to capture the heat from the spent gases. Spent gases from chemical heater 28 also travel through this zone for the same reason.

An efficient thermal insulator 36 is positioned under fuel vaporizer zone 16 to keep outer temperatures low for packaging and also to keep heat localized to the fuel reformer system. As illustrated in FIGS. 1 and 2, in this particular example, high temperature fuel cell 32 is integrated with fuel reformer 14. This particular fuel cell design allows for the operation of the fuel cell at a temperature ranging from 140–200° C. Fuel vaporizer zone 16 operates at a temperature ranging from 120–160° C. and the steam reforming reaction zone 18 operates at a temperature ranging from 200–300° C.

Additionally, in this particular embodiment of fuel processor 10, included is an exhaust gas vent 38, for the venting of exhaust gases generated by device 10, an air inlet 40 and a top current collector or cap 42 (as illustrated in FIG. 2).

It should be understood that alternative embodiments encompassing: (i) alternative fuel delivery means, either passive or active pumping; (ii)fuel vaporizer, reaction zone, and chemical heater positions; and (iii) a fuel reformer device without an integrated fuel cell, are anticipated by this disclosure. In particular, anticipated is an embodiment in which only a single fuel supply, namely methanol and water, is anticipated. This use of a single methanol and water solution would enable the fabrication of a simpler design, without any need for the device to incorporate two fuel tanks. Although it is understood that pure methanol is more efficient and preferred with respect to the chemical heater, a 1 mole water and 1 mole methanol solution will also work, but is not deemed literally as operationally efficient. Further, a heater using the water and methanol solution is suitable for practical applications, and would permit a simple common fuel reservoir for feeding the heater and reformer chambers. In this instance, the fuel delivery would be split into two chambers, the chemical heater 28 and fuel vaporizer 16.

Next, anticipated are variations on the actual design of device 10 and more particularly to the actual location of the fuel vaporizer zone 16, reaction zone 18 and chemical heater 28. In one particular alternative embodiment, it is anticipated that reaction zone 18 surrounds the chemical heater 28 on both sides (top and bottom). In yet another alternative embodiment, it is anticipated that reaction zone 18 can be positioned below heater 28 and the fuel vaporizer zone 16 on top of the chemical heater 28. In addition, and as previously stated, it is anticipated that chemical heater 28 can alternatively be an electrical heater (not shown).

Figure 3:
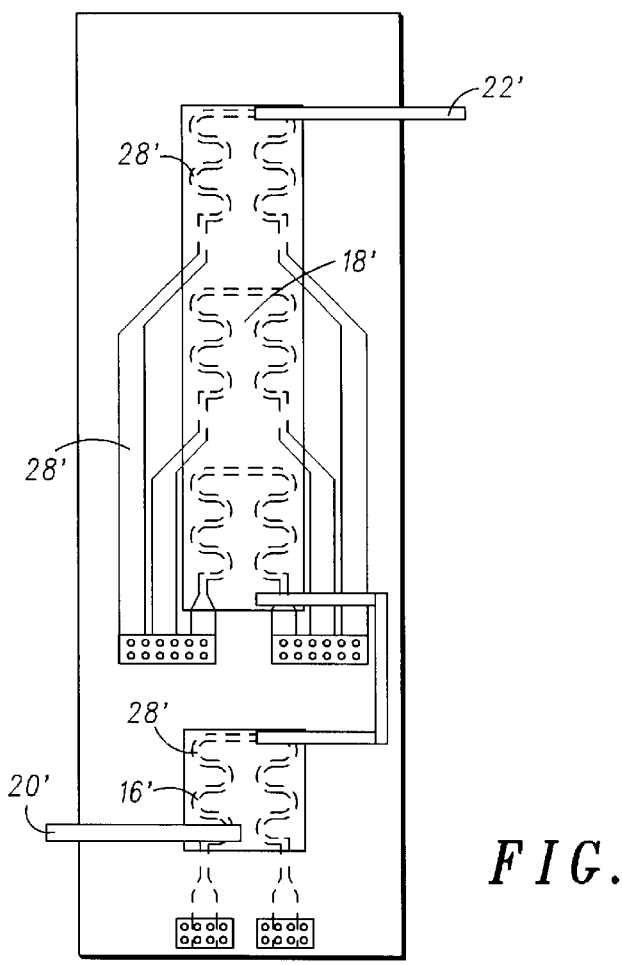
FIG. 3 is a simplified sectional view of an alternative embodiment of the fuel processor and integrated fuel cell stack of the present invention.

Finally, it is anticipated by this disclosure that although illustrated in FIGS. 1 and 2 is the integration of fuel cell stack 32, a design in which a fuel cell is not integrated with reformer 14 is additionally anticipated and illustrate in FIG. 3, discussed presently. As illustrated in FIGS. 1 and 2, when fuel cell stack 32 is integrated with fuel reformer 14, advantage can be taken of the heat of the substrate to operate high temperature fuel cell stack 32. For high power applications, it is convenient to design a separate fuel cell stack and a fuel processor unit and couple them to supply the fuel for the fuel cell. In such instances, when a fuel cell stack is not integrated with the fuel reformer, and the fuel reformer is designed as a stand alone device as illustrated in FIG. 3, external connection can be made to connect the stand alone fuel reformer to a traditional fuel cell stack for higher power applications.

Referring now to FIG. 3, illustrated is a stand alone fuel reformer 10'. It should be noted that all components similar to the components illustrated in FIGS. 1 and 2 are designated with similar numbers, having a prime added to indicate the different embodiment. As illustrated, reformer 10' includes a combination fuel comprised of liquid methanol and water, input through inlet 20', vaporizer 16', electrical heaters 28', reaction zone 18', and hydrogen enriched fuel outlet 22'. Device 10' operates generally similar to device 10 as illustrated in FIGS. 1 and 2, except in this particular embodiment, and hydrogen enriched fuel outlet 22' serves to direct the reformed hydrogen fuel toward an externally connected fuel cell (not shown). Further information on a reformed hydrogen fuel system device of this type can be found in U.S. patent application Ser. No. 99/1649,528, filed Aug. 28, 2000 and currently pending conclusion of formal examination, simultaneously filed herewith, entitled "HYDROGEN GENERATOR UTILIZING CERAMIC TECHNOLOGY", assigned to the same assignee and incorporated herein by this reference.

Figure 4:
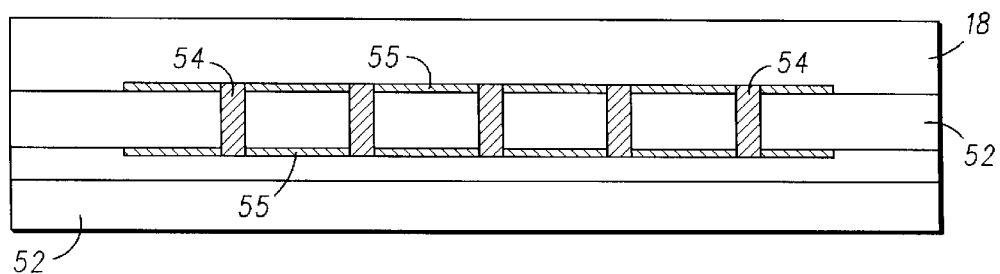
FIG. 4 is a simplified sectional view of a thermally conductive structure according to the present invention.

Referring now to FIG. 4, illustrated in simplified cross-sectional view is a thermal conductive structure, or via, generally referenced 30, such as that utilized in device 10 of FIGS. 1 and 2. Structure 30 is generally utilized for transfer of heat efficiently between chemical heater 28 and fuel vaporizer zone 16 and reaction zone 18, as well as between waste heat recovery 22 and reaction zone 18. As illustrated, thermal conductive structure 30 includes multi-layer ceramic layers 52 used in the fabrication of the monolithic structure 12. Identified is chemical heater section 28 and reaction zone chamber 18. Thermally conductive thick-film metal vias 54 thermally couple the top and bottom sections efficiently for good heat transfer. A thick-film metal layer 55 in intimate contact with chemical heater zone 28 and reaction zone 18 spreads and uniformly heats these sections.

Figure 5:
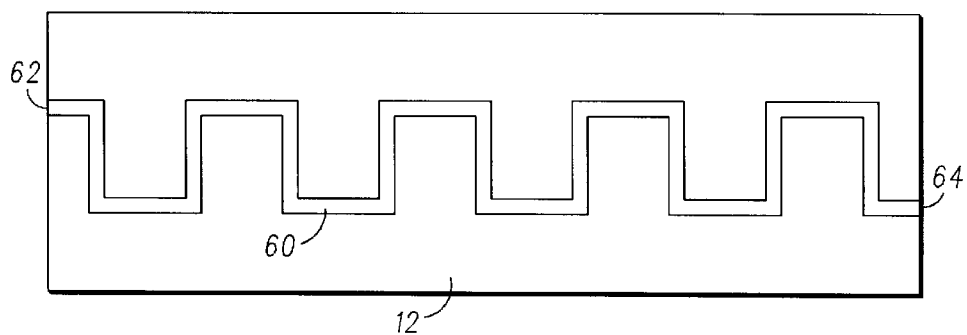
FIGS. 5 and 6 are simplified sectional views of alternative embodiments of thermally controlled vaporizer/reaction zone channels according to the present invention.
Figure 6:
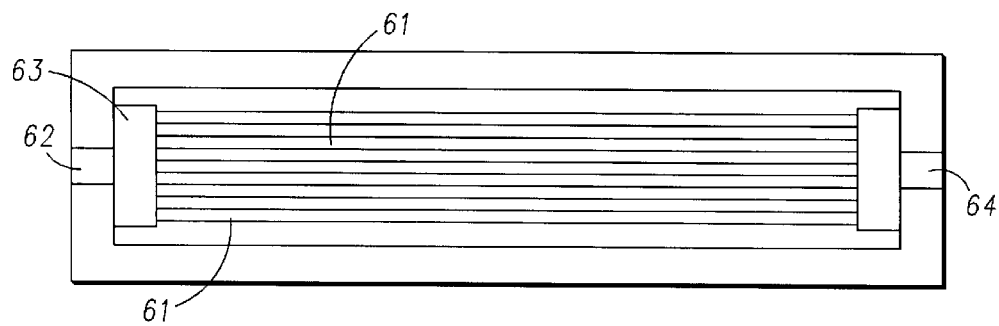

Referring now to FIGS. 5 and 6, illustrated in simplified cross-sectional or plan view is a portion of fuel vaporizer 16.

More particularly, illustrated in FIG. 5 is a serpentine channel 60, that is typically filled or coated with an inert porous ceramic material for thermal control. Alternatively, vaporizer 16 can be formed of a multiplicity of parallel channels 61, with an inert porous ceramic material for thermal control, in microfluidic communication with a porous diffuser 113. In each instance, serpentine channel 60 or parallel channel 61 includes a combined single liquid inlet feed 62 at one end and combining into a single vapor outlet at the other end 64. Serpentine channels 60 and parallel channels 61, are formed in the multi-layer ceramic structure, previously identified as 12. Reaction zone 18 includes similarly designed channels and features as found in the vaporizer zone, discussed above. More particularly, reaction zone 18 includes a reforming catalyst. The catalyst is present as channel wall coatings or as a porous packed bed of catalyst particles. One design goal is to reduce the dimensionality of the reactor channels to the order of a gas diffusion length and control gas residence times, or gas space velocity, that are favorable to reaction kinetics. A multiplicity of parallel reactor channels, generally similar to channels 61, provide for high gas throughput and minimizes back pressure issues as related to channel blockage. It should be understood that it is anticipated by this disclosure that vaporizer zone 16 and reaction zone 18 may include in addition to, or in lieu of, serpentine channels 60 and parallel channels 61, any number of cavities or chambers, or any combination of channels, cavities, or chambers, thereof.

Figure 7:
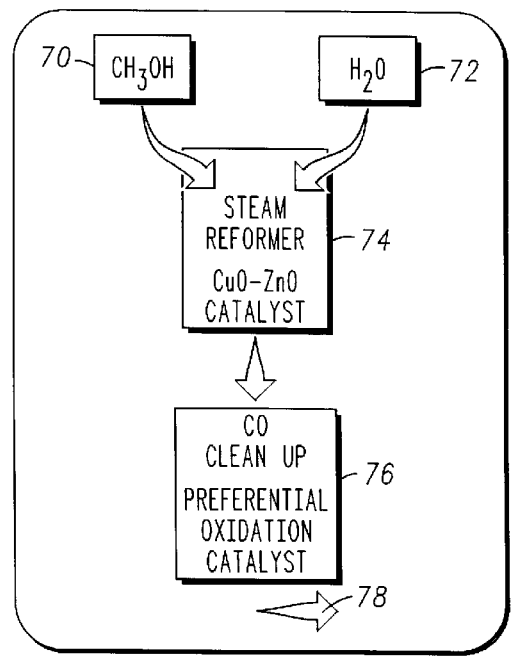
FIG. 7 is a simplified flow diagram of the method of reforming fuel according to the present invention.

Illustrated in FIG. 7 in a simplified flow chart diagram, is the chemical reaction that takes place in device 10, and more particularly in reformer 14 of device 10. As illustrated, methanol 70 and water 72 are input into a steam reformer 74, generally similar to reformer 14 of FIGS. 1 and 2. Steam reformer 74 operates at a temperature of approximately 250° C. to reform the input methanol 70 and water 72 into a reformed gas mixture, generally referred to as the hydrogen enriched gas. More particularly, in the presence of a catalyst, such as copper oxide, zinc oxide, or copper zinc oxide, the methanol 70 and water 72 solution is reformed into hydrogen, carbon dioxide, and some carbon monoxide. Steam reformer 74 operates in conjunction with an optional carbon monoxide cleanup 76, that in the presence of a preferential oxidation catalyst and air (or $O_2$), reforms a large percentage of the present carbon monoxide into carbon dioxide. This reformed gas mixture supplies fuel through fuel output 78 to a fuel cell, generally similar to fuel cell 32 of FIGS. 1 and 2.

Figure 8:
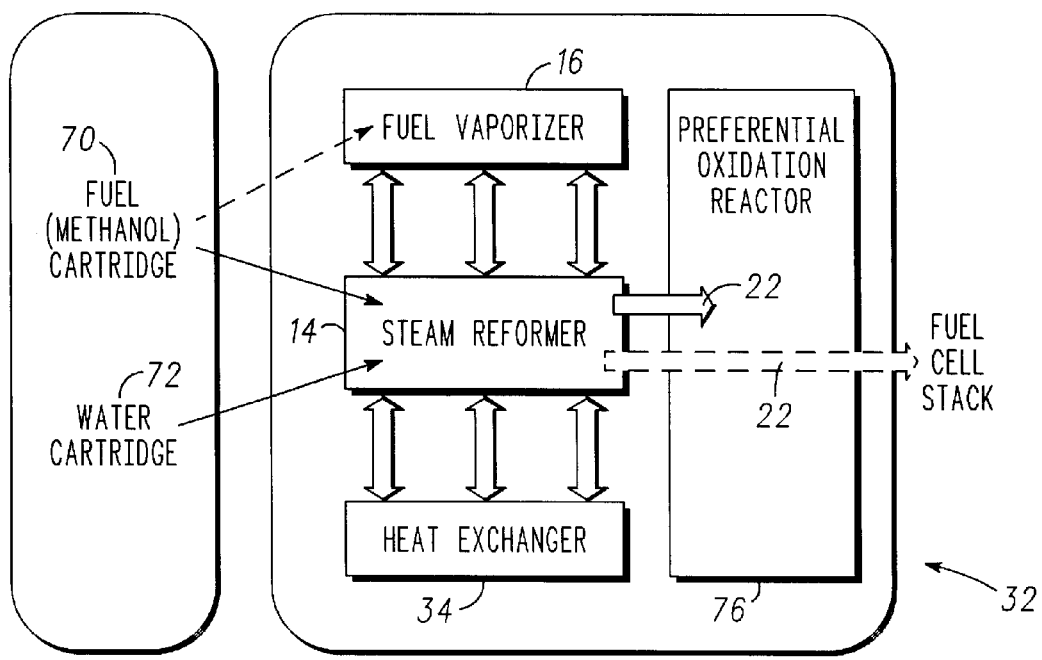
FIG. 8 is a schematic diagram of the fuel cell system integrated with a fuel reformer according to the present invention.

Illustrated in FIG. 8 is a schematic diagram of fuel cell system 10 with integrated fuel reformer 14. As shown in this diagram, fuel cell 32 can be operated directly using output 22 from fuel reformer 14 without CO clean up. In this instance fuel cell 32 is a high temperature fuel cell. An advantage of the integration of a traditional fuel cell stack 32 with the fuel processor 14, as illustrated, is the ability to operate fuel cell 32 at higher temperatures of 140–200° C. by taking advantage of the heat from reformer 14. High temperature fuel cell membranes such as PBI (polybenzimidazole), or similar polymer composition known as ABPBI can be used in these applications. These fuel cell membranes operating at temperatures greater than 120° C. have much higher tolerance up to a combined total of 5% (mol) CO and methanol in the reformed hydrogen output from the fuel processor. Use of these membranes eliminates the need for a CO clean up step using the preferential oxidation reactor zone and simplifies the system design. In the alternative, by incorporating a CO preferential clean up reactor after steam reformer 14, a traditional fuel cell 32 can be operated.

Accordingly, described is a fuel processor including a ceramic carrier defining a reaction zone including a catalyst. The ceramic carrier further includes a heat source thermally coupled to the reaction zone chamber. An inlet channel is supplied for input of the liquid fuel to the fuel processor and an outlet channel is supplied for the output of the reformed gas mixture. The fuel processor device is formed as a monolithically integrated structure, generally comprised of a plurality of thin ceramic layers assembled and then sintered in such a way as to provide for the closed heating zones in which the encapsulated catalysts reforms the inlet fuel into mostly hydrogen gas suitable for use with a fuel cell stack.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. An integrated system having at least a fuel processor and a fuel cell, said integrated system comprising:
   a ceramic carrier defining a fuel reformer, the fuel reformer including a reaction zone including a reforming catalyst arid a heat source thermally coupled to the reaction zone;
   an inlet channel for liquid fuel;
   an outlet channel for hydrogen enriched gas; and
   at least one microchannel in fluid communication with the outlet channel.

2. A fuel processor and integrated fuel cell as claimed in claim 1 wherein the fuel reformer further includes a vaporization zone.

3. A fuel processor and integrated fuel cell as claimed in claim 1 wherein the heat source is an integrated heater.

4. A fuel processor and integrated fuel cell as claimed in claim 1 wherein the heat source is an integrated resistive heater that is electrically driven.

5. A fuel processor and integrated fuel cell as claimed in claim 3 wherein the integrated heater is a chemical heater including a catalyst and arranged to oxidize fuel to produce heat.

6. A fuel processor and integrated fuel cell as claimed in claim 5 wherein the chemical heater further includes an air inlet for providing oxygen for the oxidation of the fuel and the inlet channel includes an opening to provide fuel to the chemical heater.

7. A fuel processor and integrated fuel cell as claimed in claim 3 wherein the integrated heater couples heat to the vaporization zone and reaction zone using thermally conductive structures.

8. A fuel processor and integrated fuel cell as claimed in claim 2 wherein one of the vaporization zone and the reaction zone include a plurality of parallel channels.

9. A fuel processor and integrated fuel cell as claimed in claim 2 wherein one of the vaporization zone and the reaction zone include at least one serpentine channel.

10. A fuel processor and integrated fuel cell as claimed in claim 1 wherein the ceramic carrier is a monolithic three-dimensional multilayer ceramic structure.

11. An integrated system having at least a fuel processor and a fuel cell, said integrated system comprising:
    a monolithic three-dimensional multilayer ceramic carrier structure defining a fuel reformer including a vaporization zone and a reaction zone including a reforming catalyst, the ceramic carrier further including an integrated heater thermally coupled to the reaction zone;

an inlet channel fur liquid fuel;

an outlet channel for hydrogen enriched gas; and an integrated fuel cell stack, in microfluidic communication with the outlet channel.

12. A fuel processor and integrated fuel cell as claimed in claim 11 wherein the integrated heater is a resistive heater that is electrically driven.

13. A fuel processor and integrated fuel cell as claimed in claim 11 wherein the integrated heater is a chemical heater including a catalyst and arranged to oxidize fuel to produce heat.

14. A fuel processor and integrated fuel cell as claimed in claim 13 wherein the chemical heater further includes an air port for providing oxygen for the oxidation of the fuel and the inlet channel includes an opening to provide fuel to the chemical heater.

15. A fuel processor and integrated fuel cell as claimed in claim 11 wherein the integrated heater couples heat to the vaporization zone and reaction zone using thermally conductive structures.

16. A fuel processor and integrated fuel cell as claimed in claim 11 wherein one of the vaporization zone and the reaction zone include a plurality of parallel channels.

17. A fuel processor and integrated fuel cell as claimed in claim 11 wherein one of the vaporization zone and the reaction zone include at least one serpentine channel.

18. An integrated system having at least a fuel processor and a fuel cell, said integrated system comprising:

a monolithic three-dimensional multilayer ceramic carrier structure defining a fuel reformer including a vaporization zone and a reaction zone including a reforming catalyst, at least one of the vaporization zone and the reaction zone including one of a plurality of parallel channels or at least one serpentine channel, the ceramic carrier further including an integrated heater thermally coupled to the vaporization zone and reaction zone using thermally conductive structures;

an inlet channel for liquid fuel;

an outlet channel for hydrogen enriched gas; and an integrated fuel cell stack, in microfluidic communication with the outlet channel.

19. A fuel processor and integrated fuel cell as claimed in claim 18 wherein the integrated heater is a resistive heater that is electrically driven.

20. A fuel processor and integrated fuel cell as claimed in claim 18 wherein the integrated heater is a chemical heater including a catalyst and arranged to oxidize fuel to produce heat.

21. A fuel processor and integrated fuel cell as claimed in claim 20 wherein the chemical heater further includes an air port for providing oxygen for the oxidation of the fuel and the inlet channel includes an opening to provide fuel to the chemical heater.

* * * * *